(12) United States Patent
Garg et al.

(10) Patent No.: US 8,576,225 B2
(45) Date of Patent: Nov. 5, 2013

(54) SEAMLESS FRACTURE IN A PRODUCTION PIPELINE

(75) Inventors: Akash Garg, Irvine, CA (US); Kyle Maxwell, San Bruno, CA (US); David Lipton, San Mateo, CA (US)

(73) Assignee: DreamWorks Animation LLC, Glendale, CA (US)

( * ) Notice: Subject to any disclaimer, the term of this patent is extended or adjusted under 35 U.S.C. 154(b) by 326 days.

(21) Appl. No.: 12/835,637

(22) Filed: Jul. 13, 2010

(65) Prior Publication Data

US 2012/0001909 A1      Jan. 5, 2012

Related U.S. Application Data

(60) Provisional application No. 61/360,475, filed on Jun. 30, 2010.

(51) Int. Cl.
*G06T 17/00* (2006.01)
(52) U.S. Cl.
USPC ........... 345/420; 345/419; 345/581; 345/619; 345/646; 345/647; 345/473
(58) Field of Classification Search
USPC ......................................... 345/424, 630, 419
See application file for complete search history.

(56) References Cited

U.S. PATENT DOCUMENTS

| | | | | |
|---|---|---|---|---|
| 6,456,289 | B1 * | 9/2002 | O'Brien et al. | 345/473 |
| 6,813,592 | B1 * | 11/2004 | Dhondt | 703/2 |
| 7,119,817 | B1 | 10/2006 | Kawakami | |
| 2004/0070583 | A1 * | 4/2004 | Tsai et al. | 345/419 |
| 2007/0206008 | A1 * | 9/2007 | Kaufman et al. | 345/424 |
| 2008/0096660 | A1 * | 4/2008 | Ota | 463/39 |
| 2009/0040219 | A1 * | 2/2009 | Museth | 345/423 |

FOREIGN PATENT DOCUMENTS

EP      1913987 A1      4/2008

OTHER PUBLICATIONS

Norton, Alan; Turk, Greg; Bacon, Bob; Gerth, John; Sweeney, Paula; "Animation of fracture by physical modeling"; The Visual Computer vol. 7, Issue: 4; Jul. 1, 1991; Springer Berlin / Heidelberg; ISSN: 0178-2789 210-219; http://dx.doi.org/10.1007/BF01900837; Doi: 10.1007/BF01900837.*
Tao Ju, Frank Losasso, Scott Schaefer, and Joe Warren. 2002. Dual contouring of hermite data. ACM Trans. Graph. 21, 3 (Jul. 2002), 339-346. DOI=10.1145/566654.566586 http://doi.acm.org/10.1145/566654.566586.*
Extended European Search Report and Search Opinion received for European Patent Application No. 11172261.7, mailed on Jul. 19, 2013, 11 pages.

(Continued)

*Primary Examiner* — Phi Hoang
(74) *Attorney, Agent, or Firm* — Morrison & Foerster LLP

(57) ABSTRACT

Systems and processes for rendering fractures in an object are provided. In one example, a surface representation of an object may be converted into a volumetric representation of the object. The volumetric representation of the object may be divided into volumetric representations of two or more fragments. The volumetric representations of the two or more fragments may be converted into surface representations of the two or more fragments. Additional information associated with attributes of adjacent fragments may be used to convert the volumetric representations of the two or more fragments into surface representations of the two or more fragments. The surface representations of the two or more fragments may be displayed.

16 Claims, 12 Drawing Sheets

(56) References Cited

OTHER PUBLICATIONS

Feng et al., "Piecewise Tri-Linear Contouring for Multi-Material Volumes", Advances in Geometric Modeling and Processing, Lecture Notes in Computer Science, vol. 6130, 2010, 14 pages.

Garg et al., "Seamless Fracture in a Production Pipeline", ACM SIGGRAPH, Jul. 25-29, 2010, 1 page.

Hellrung et al., "Geometric Fracture Modeling in BOLT", SIGGRAPH, 2009, 1 page.

Ju, Tao, "Robust Repair of Polygonal Models", ACM SIGGRAPH, Aug. 2004, 8 pages.

Moreland et al., "Analysis of Fragmentation in Shock Physics Simulation", Proceedings of the 2008 Workshop on Ultrascale Visualization, 2008, pp. 1-7.

Museth et al., "CrackTastic: Fast 3D Fragmentation in "The Mummy: Tomb of the Dragon Emperor"", ACM SIGGRAPH, Sketches & Applications, Aug. 11-15, 2008, 1 page.

Nooruddin et al., "Simplification and Repair of Polygonal Models Using Volumetric Techniques", IEEE Transactions on Visualization and Computer Graphics, vol. 9, No. 2, Apr.-Jun. 2003, pp. 191-205.

Weinstein et al., "Destruction System", ACM SIGGRAPH, Aug. 11-15, 2008, 1 page.

\* cited by examiner

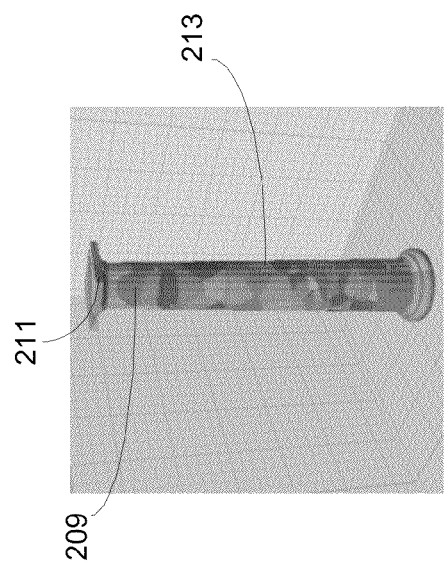
Figure 2B
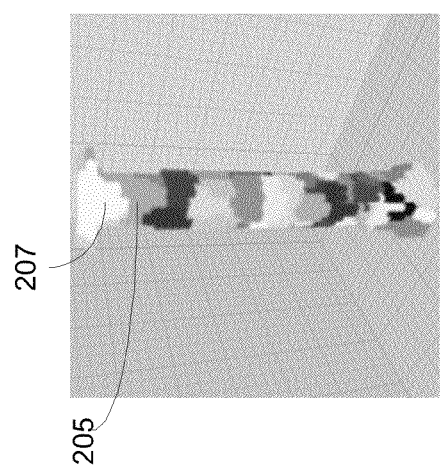
Figure 2D
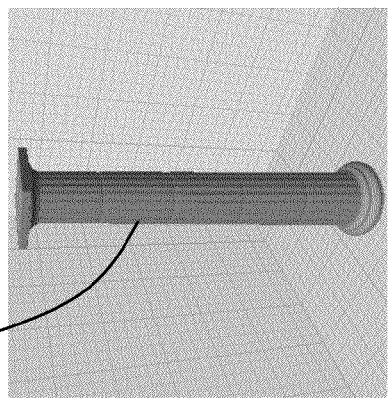
Figure 2A
Figure 2C

700

SEAMLESS FRACTURE IN A PRODUCTION PIPELINE

BACKGROUND

1. Field

This application relates generally to computer graphics, and more specifically to computer systems and processes for rendering fractures in objects.

2. Related Art

To show fracture effects in animated films, for example, to show a teacup breaking into multiple fragments, animators generally define the fragments prior to showing the breaking of the object. This may be done by taking a representation of the original object and dividing the representation into the multiple fragments. The fragments may then be assembled to reconstruct the object, creating the appearance that the reconstructed object is in an unfractured state. This reconstructed object may then be used to represent the object in its unfractured state throughout the animated film. Since the reconstructed object comprises multiple fragments, the multiple fragments may simply be separated from each other to animate fracturing of the object.

While methods have been developed to generate fracture effects as described above, conventional methods often produce gaps between edges of adjacent fragments, leaving visible fracture lines in the reconstructed object. To overcome this problem, animators generally hide the fracture lines using motion blurring or show the object at a particular angle such that the fracture lines are not visible. Alternatively, animators may manually fill the fracture lines after the image is rendered. While these techniques prevent the viewer from seeing the fracture lines, these methods are time consuming and may prevent animators from using all possible viewing angles in a scene.

Additionally, conventional animation methods produce reconstructed objects having non-uniform surface characteristics between edges of adjacent fragments, creating visible discontinuities between the fragments. To overcome this problem, animators may manually alter the surface characteristics to smooth transitions between surfaces of each fragment. While this may reduce the surface discontinuities, it is an inefficient and time-consuming process.

Thus, a process for seamlessly rendering fractures in objects is desired.

SUMMARY

In one exemplary embodiment, an exemplary process for rendering a reconstructed object comprising a plurality of fragments, wherein the reconstructed object is for animating an object to be fractured into the plurality of fragments is provided. In one example process, a surface representation of an object may be converted into a volumetric representation of the object. Vector data associated with the surface representation of the object may be generated. The volumetric representation of the object may be divided into volumetric representations of a plurality of fragments. Surface representations of the plurality of fragments may be generated based at least in part on the volumetric representations of the plurality of fragments and the vector data. The plurality of surface representations for each of the plurality of fragments arranged to form the reconstructed object may be displayed.

In another exemplary embodiment, data associated with a second fragment of the plurality of fragments may be used to generate a first surface representation of a first fragment of the plurality of fragments. The data associated with a second fragment may not be displayed with the surface representation of the plurality of fragments.

In another exemplary embodiment, an exemplary process for rendering a first fragment of a reconstructed object, the reconstructed object comprising a plurality of fragments, wherein the reconstructed object is for animating an object to be fractured into the plurality of fragments is provided. In one example process, at least one characteristic of a surface representation of the first fragment may be evaluated using data associated with a second fragment of the plurality of fragments. The surface representation of the first fragment may be displayed using the evaluated at least one characteristic.

In other exemplary embodiments, systems and computer-readable storage mediums are provided for carrying out processes for rendering fractured objects.

BRIEF DESCRIPTION OF THE FIGURES

FIGS. 2A-D illustrate visual representations of an object at various stages of the exemplary production pipeline of FIG. 1.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Various embodiments are described below relating to rendering an object to be fractured. In one example, an exemplary process for rendering an object to be fractured is provided. In one example process, a surface representation of an object may be converted into a volumetric representation of the object. The volumetric representation of the object may be divided into volumetric representations of two or more fragments. Surface representations of the two or more fragments may be generated based at least in part on the volumetric representations of the two or more fragments. Additional information associated with attributes of adjacent fragments may be used to generate the surface representations of the two or more fragments. The surface representations of the two or more fragments may be displayed.

Figure 1:
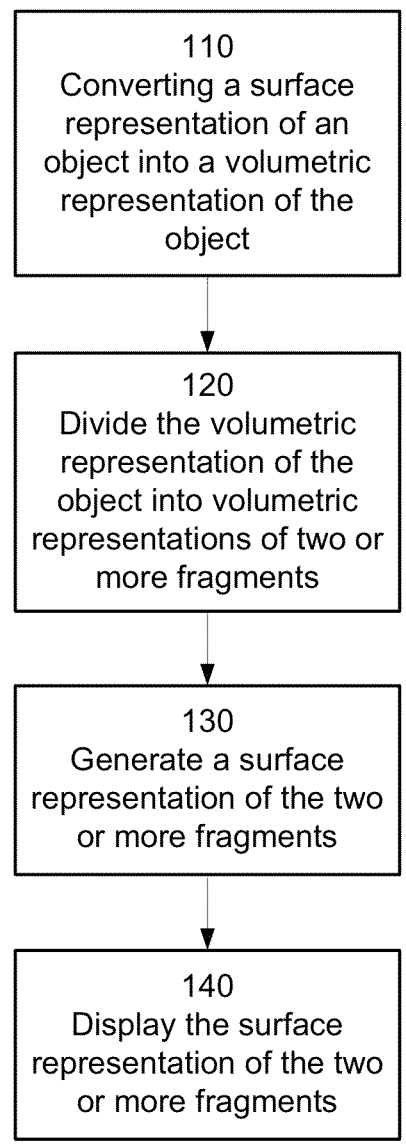
FIG. 1 illustrates an exemplary production pipeline process for rendering an object to be fractured.

FIG. 1 illustrates exemplary production pipeline process 100 for rendering an object to be fractured into multiple fragments according to one embodiment. Exemplary process 100 will be described with reference to an example shown in FIG. 2. At block 110, a surface representation 201 of an object 200 may be converted into a volumetric representation 203 of the object 200. The surface representation may include data representing a polygonal representation of the surface of the object. The surface representation may further include surface characteristic data associated with each polygon (or tile) of the polygonal representation, such as texture coordinates, part information (e.g., data identifying the object that the surface tile represents), metadata, color, and the like. As will be appreciated by one of ordinary skill, other types of surface representations characterizing the surface of the object may be used, for example, parametric or implicit surface models. In one example, if the surface representation includes parametric or implicit surface models, the surface models may be converted into a polygonal representation using methods known to those of ordinary skill in the art.

Figure 3:
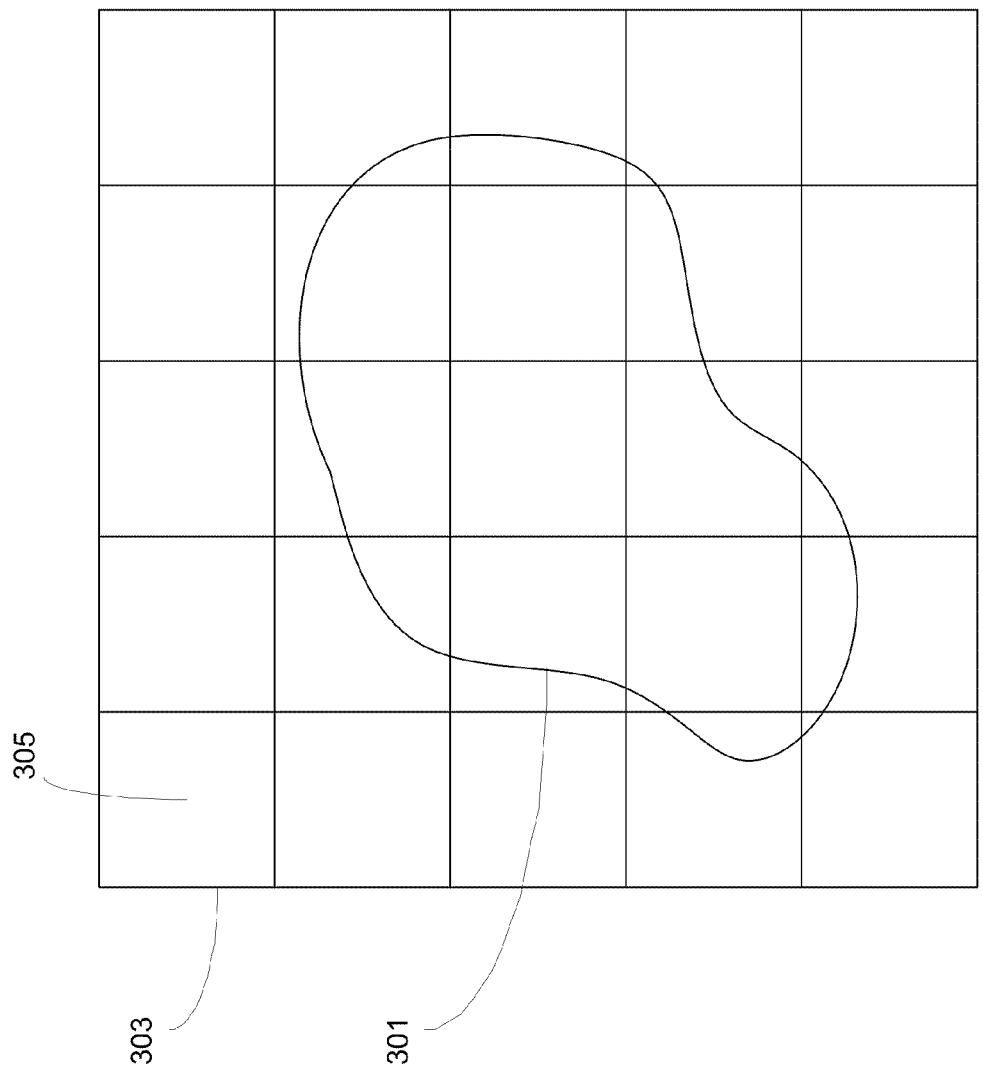
FIG. 3 illustrates a surface representation of an object overlaid on a grid of voxels.

In one example, the volumetric representation 203 of the object 200 may be generated from the surface representation 201 using a filling algorithm, such as "voxelization." Voxelization includes placing a three-dimensional (3-D) surface model of an object within a 3-D grid of cells, where each cell of the grid represents a voxel. The resulting grid contains 1) voxels that are completely inside the object, 2) voxels that are completely outside of the object, and 3) voxels that intersect the surface of the object. To illustrate the voxelization concept, FIG. 3 shows object 301 placed within grid 303 containing multiple cells 305. It should be appreciated that while object 301 is shown as a two-dimensional (2-D) object in FIG. 3, object 301 may be a 3-D object extending both into and out of the page.

Figure 4:
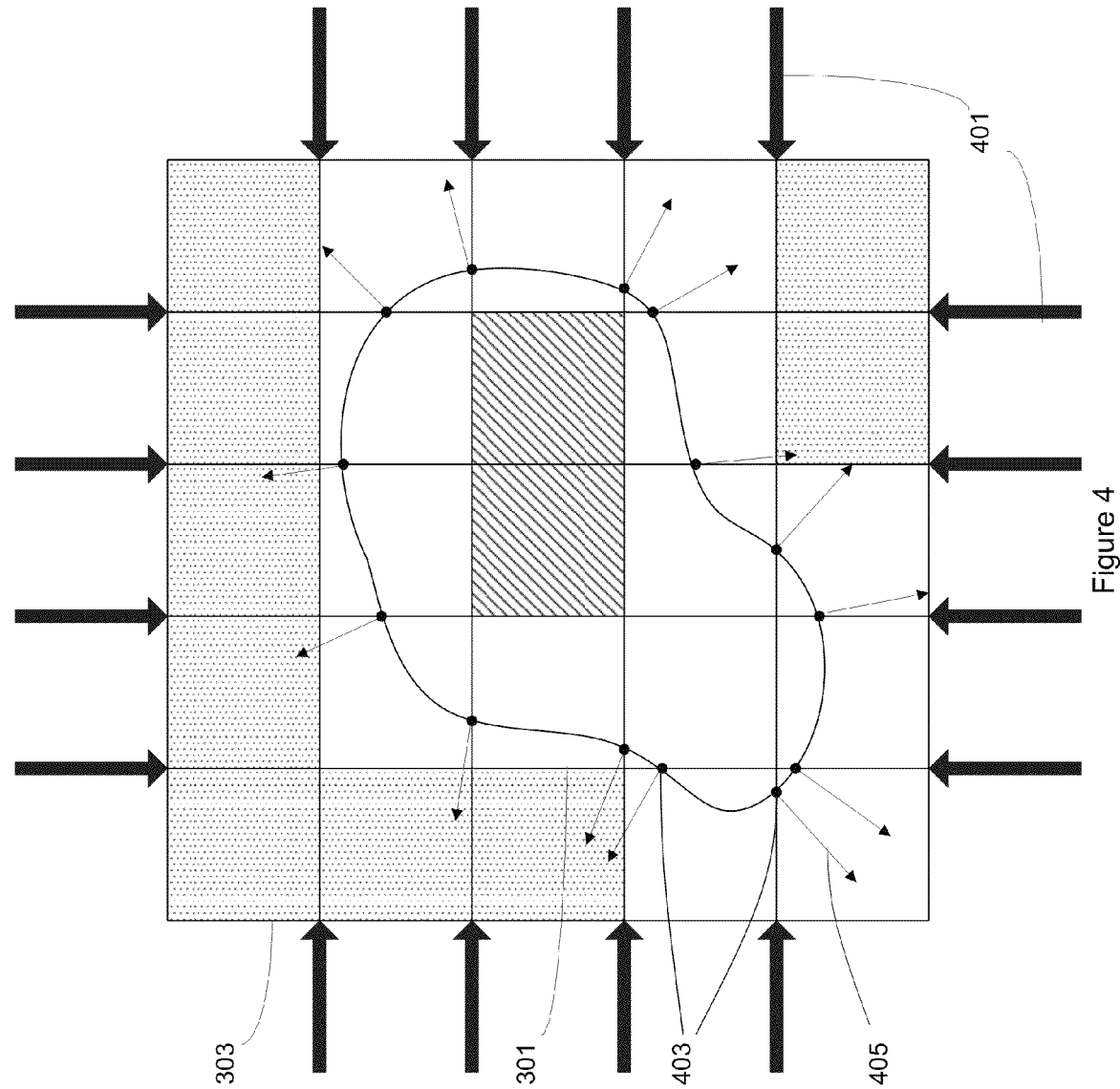
FIG. 4 illustrates voxelization using the ray-stabbing process.

In one example, a process of voxelization using "ray-stabbing" may be used, for example, as described in "Simplification and Repair of Polygonal Models Using Volumetric Techniques," by F. S. Nooruddin and Greg Turk, which is hereby incorporated by reference in its entirety for all purposes as if put forth in full below. The ray-stabbing process classifies each voxel into one of the three categories listed above by projecting rays into the object in each of the primary directions in 3-D, for example, along the x-axis, y-axis, and z-axis. The first and last locations where the ray intersects the surface of the object may be stored. Voxels located at the first and last locations are classified as intersecting the surface, voxels positioned between the first and last locations are classified as being completely interior to the object, and the remaining voxels are classified as being exterior to the object. To illustrate, FIG. 4 shows the ray-stabbing process applied to object 301 from two primary directions (left to right and top to bottom) indicated by arrows 401. Points 403 represent the first and last locations where the rays intersect the surface of object 301. The unmarked squares represent voxels that intersect the surface of the object, dotted squares represent voxels that are completely outside of the object, and the dashed squares represent voxels that are completely inside the object.

In some situations, a ray may incorrectly characterize a voxel as being inside the object. This may occur, for example, with concave objects. To correct this error, ray-stabbing from additional directions may be used. Thus, if any voxel is classified to be exterior to the object in any of the ray-stabbing directions, the voxel is given an exterior final classification. In one example, 13 or more ray-stabbing directions may be used. However, it should be appreciated that any number of ray-stabbing directions may be used.

In one example, to generate a high-fidelity output, vector data and surface characteristic data may be stored during the voxelization process. Vector data may include the normal vector and position where the ray intersects the surface of the object during the ray-stabbing process. For example, FIG. 4 illustrates object 301 and normal vectors 405 for each intersection point 403 generated from vertical and horizontal ray-stabbing. The location of the intersection points 403, normal vectors 405, and surface characteristic data at intersection points 403, such as texture coordinates, part information, metadata, color, and the like, may be stored. It should be appreciated that additional vectors and intersection points may be formed when using additional ray-stabbing directions.

Referring back to FIG. 1, at block 120, the volumetric representation 203 of the object 200 may be divided into volumetric representations 205 and 207 of two or more fragments. In one example, this may be performed by receiving input from a user defining each fragment of the fractured object. Boolean operations may then be performed to segment each fragment. For example, overlapping voxels that are marked as "inside" may be considered to be inside voxels for a new fragment. The voxels from the original object that are marked as surface-intersecting voxels in the desired fragment are considered to be intersecting voxels for the new fragment, and all other voxels are marked as outside. The result is a fragment defined by the boundaries provided by the user that is a subset of the original object.

In one example, the boundaries of the desired fragments may be entered using a painting interface that allows the animator to paint the surface of the object using different colors to define each fragment. Each color used corresponds to a different fragment. In one example, the software package Autodesk® Maya® may be used to provide this paint interface. In another example, the fragments may be defined using Voronoi particles, where each particle represents a different cell or fragment. However, one of ordinary skill will appreciate that other processes and applications may be used to define the boundaries of each fragment, and that any such process or application may be used.

Since the object fragments are represented using volumetric data (e.g., volumetric representations 205 and 207 comprising voxels), the fragment representations may be more easily modified after being generated. For example, if an animator wants to modify volumetric representations 205 and 207, the animator may simply reassign specific voxels to the desired volumetric representation. Similarly, the volumetric representations may be combined by connecting the volumetric representations with voxels that lie between the volumetric representations.

At block 130, surface representations 209 and 211 of the two or more fragments may be generated from the volumetric representations 205 and 207 of the two or more fragments. This may be done because most production pipelines are designed to work with surface representations or meshes rather than volumetric representations. In one example, the process used to convert the volumetric representations of fragments into surface representations may use the vector data stored at block 110 and a modified version of the "Dual Contouring" process described in "Dual Contouring of Hermite Data," by Tao Ju, Frank Losasso, Scott Schaefer, and Joe Warren, which is hereby incorporated by reference in its entirety for all purposes as if put forth in full below. Using the vector data may eliminate, or at least reduce, the gaps between the surface representations 209 and 211 of surface reconstruction 213 that may be seen using conventional surface generation techniques.

Figure 5C:
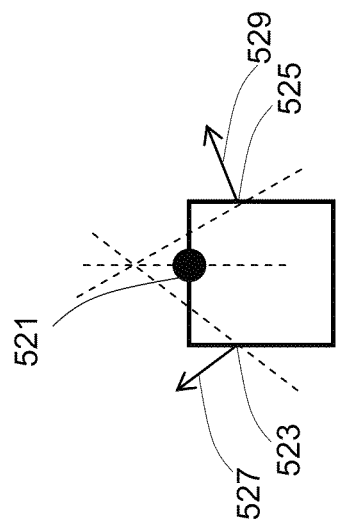
FIGS. 5A-C illustrate exemplary processes for determining a vertex using position and normal vector data.
Figure 5B:
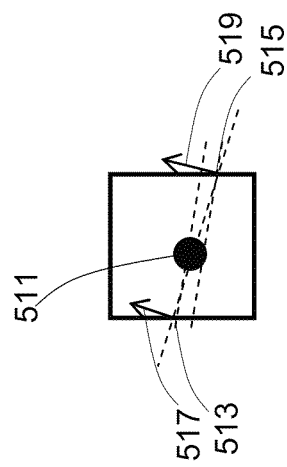
Figure 5A:
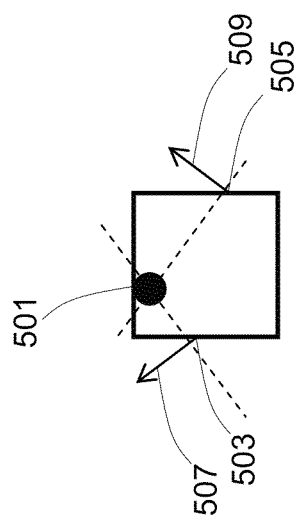

An exemplary dual contouring process may operate on the dual of the 3-D voxel grid. The dual of the 3-D grid maps voxels of the voxel grid to vertices of the dual mesh, and voxel-edges of the voxel grid to faces of the dual mesh. The dual mesh of the 3-D voxel grid may be formed by placing a vertex within the voxels of the 3-D voxel grid that contain one or more edges that intersect the surface of the object. The position of the vertex within each voxel may be determined using the one or more positions where the surface of the object intersects the one or more edges. A process for determining the position of the vertex within the voxels is described by "Dual Contouring of Hermite Data," by Tao Ju, Frank Losasso, Scott Schaefer, and Joe Warren. To illustrate, FIGS. 5A-C show examples of determining the position of a vertex using the least squares algorithm with intersection points and normal vectors as input. Specifically, FIG. 5A shows the basic situation where the vectors (represented by dashed lines) perpendicular to normal vectors 507 and 509 and passing through intersection points 503 and 505 intersect within the cell. In this case, the intersection point may be the position of vertex 501. FIG. 5B shows the degenerate case where the vectors (represented by dashed lines) perpendicular to normal vectors 517 and 519 and passing through intersection points 513 and 515 are parallel. In this case, a masspoint algorithm may be used to determine the position of vertex 511. FIG. 5C shows the case where the vectors (represented by dashed lines) perpendicular to normal vectors 527 and 529 and passing through intersection points 523 and 525 intersect outside the cell. In this case, the point within the cell closest to the intersection point may be the position of vertex 521. After determining the position of each vertex, since each voxel edge in 3-D space is shared by four voxels, the vertices in these four voxels may be connected to form a quadrilateral face of the dual. This may be done for all voxel grid edges that intersect the surface of the object. While the examples above describe forming quadrilateral faces, it should be appreciated that other polygonal faces may be generated, such as trilateral faces.

Figure 6:
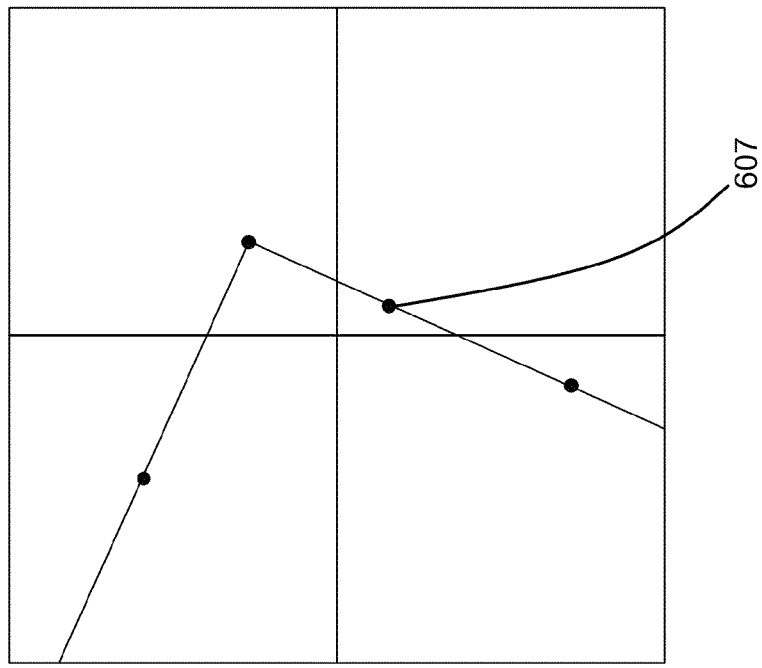
FIG. 6 illustrates the dual conversion of a grid of voxels.
Figure 6:
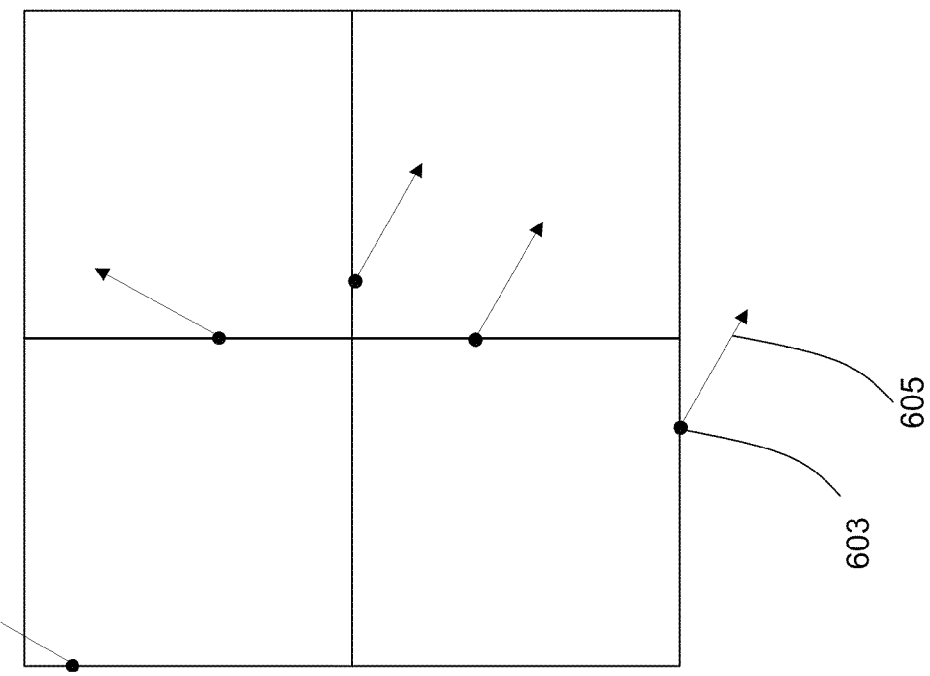

To illustrate the dual concept, FIG. 6 shows normal vectors 605 for each intersection point 603 between the surface of an object and a voxel edge. These normal vectors 605 and intersection points 603 may have been stored, for example, at block 110 when generating the volumetric representation of the object. The position of each intersection point 603 and normal vector 605 at each of those positions may be used to generate a vertex 607 within each voxel. The vertices 607 between voxels sharing the same edge may be connected as shown in the image on the right side of FIG. 6. It should be appreciated by one of ordinary skill that while the example shown in FIG. 6 is a 2-D object, the process may be similarly applied to a 3-D object.

In one example, as described above, surface characteristic data such as texture coordinates, part information, metadata, color, and the like, may be stored along with the position and normal vector data where the ray intersects the surface of the object during the ray-stabbing process. Thus, the surface characteristic data may be stored on the voxel edges. As described above, voxel edges map to faces of the dual mesh, and as a result, the surface data stored on voxel edges may be located on the polygonal face of the dual mesh. For some types of surface data, the data may be evaluated on the face of the dual mesh. However, for other types of surface data, such as texture coordinates, evaluation may instead be performed on the vertices of the dual mesh. This is because these types of data may need to vary across the face of the dual mesh. For example, if a value represents texture coordinates and if that value is evaluated on the face, then the value will be constant across the face, resulting in a surface resembling a quilt with constant color patches. However, if the value is evaluated on the vertices of the dual mesh, the resulting surface will contain continuous textures across the surface.

A simple linear system may be used to solve the values at vertices given values on the faces of the dual mesh. Evaluating values at vertices using the linear system works well for interior portions of the mesh, but may produce discontinuities between boundaries of adjacent fragments in a reconstructed object because adjacent fragments share vertices, but not faces. Thus, evaluating attributes on vertices using data stored on faces may give different results for vertices on adjacent portions of the fragments, creating visible discontinuities in the object.

In one embodiment, to eliminate, or at least reduce, visible discontinuities between boundaries of adjacent fragments, ghost cells may be added to each of the adjacent fragments. The ghost cells may be an additional layer of faces that are added around the boundary of each fragment to provide information about attributes that lie on faces of adjacent fragments. The use of ghost cells will be described in greater detail below with respect to FIGS. 7-10.

In one example, for the surface data that do not lie on vertices, such as segment information, no interpolation or solving is required. However, there may be artifacts around boundaries of this data since faces in the original input mesh may not exactly match faces of the output mesh. As a result, such attribute boundaries may need to be detected and smoothed to resolve these artifacts. The smoothing procedure is a 2-D procedure on the mesh performed in the 3-D domain. Thus, each iteration of a smoothing operation may move vertices outside the plane of the mesh. To avoid this, the vertices may be projected back onto the original mesh to preserve fidelity. Such smoothing algorithms are known to those of ordinary skill in the art, and any such algorithm may be used. For example, the Laplacian Smoothing algorithm, Taubin Smoothing algorithm, or the Mean-Curvature Smoothing algorithm may be used.

At block 140, a surface reconstruction 213 of the object 200 may be displayed using the surface representations 209 and 211 of the two or more fragments. This may be done, for example, by piecing together the surface representations of the two or more fragments generated at block 130 to form the reconstructed object. While object 200 is shown at all stages of exemplary process 100, it should be appreciated that a visual representation may not be displayed at each stage of exemplary process 100. Instead, a data representation of object 200 may be processed as described above without displaying a visual representation of the object.

In some examples, the resolution of images produced using exemplary production pipeline process 100 may be varied by changing the voxel size/resolution used at block 110. For instance, large voxels may be used at block 110 to produce low-resolution images to provide an animator with a rough sketch of the fractured object without having to waste the time and computing resources required to render a high-resolution image. Thus, the animator may iteratively edit the fractured object based on the low-resolution images in a shorter amount of time due to the reduced rendering time required to produce the low-resolution images. Once the animator is satisfied with the fractures shown in the low-resolution images, exemplary production pipeline process 100 may be performed using the same input model and smaller voxels at block 110. The resulting image will have fractures having the same general shape as the low-resolution version, but with greater surface details. This feature of varying the rendering resolution may not be possible using geometry-based techniques, as those techniques are limited by the resolution of the surface models being fractured. This is because geometry-based techniques generate fragments from surface representations of the object, and must therefore process the surface characteristics when rendering the fragments. However, unlike geometry-based techniques, exemplary production pipeline process 100 uses volumetric representations. Thus, the surface characteristics may be ignored, or set to a lower resolution, to generate low-resolution renderings of the fractured object in a shorter amount of time.

Figure 7:
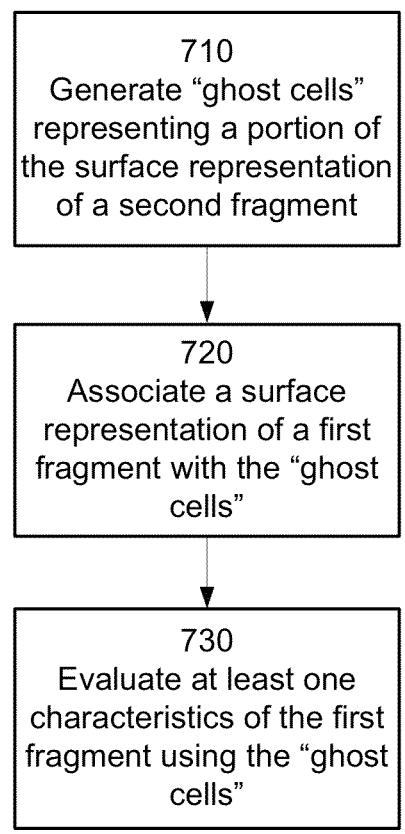
FIG. 7 illustrates an exemplary process for rendering a portion of an object to be fractured using ghost cells.

FIG. 7 illustrates an exemplary process 700 for using ghost cells to render a first fragment of an object to be fractured into multiple fragments. As used herein, a "ghost cell" refers to data associated with a first fragment of an object to be fractured that is used to render at least a portion of the first fragment of the object. The ghost cell may include data associated with a second fragment of the object to be fractured. The ghost cells may be used to provide additional surface characteristic data of adjacent fragments of the object to be fractured to generate smoother transitions between the fragments, thereby reducing or eliminating surface discontinuities between fragments in the reconstructed object.

In one embodiment, exemplary process 700 may be used at block 130 of process 100 to evaluate attributes on vertices of the output mesh. As discussed above with respect to block 130 of FIG. 1, when creating an output mesh by generating the dual of a 3-D voxel grid, certain attributes must be evaluated on vertices of the output mesh. While evaluating values at vertices using a linear system generally works well for interior portions of the mesh, discontinuities may be produced between boundaries of adjacent fragments. This is because adjacent fragments share vertices, but not faces. Thus, evaluating attributes on vertices from faces gives different results for vertices on either fragment, creating visible discontinuities.

Figure 8:
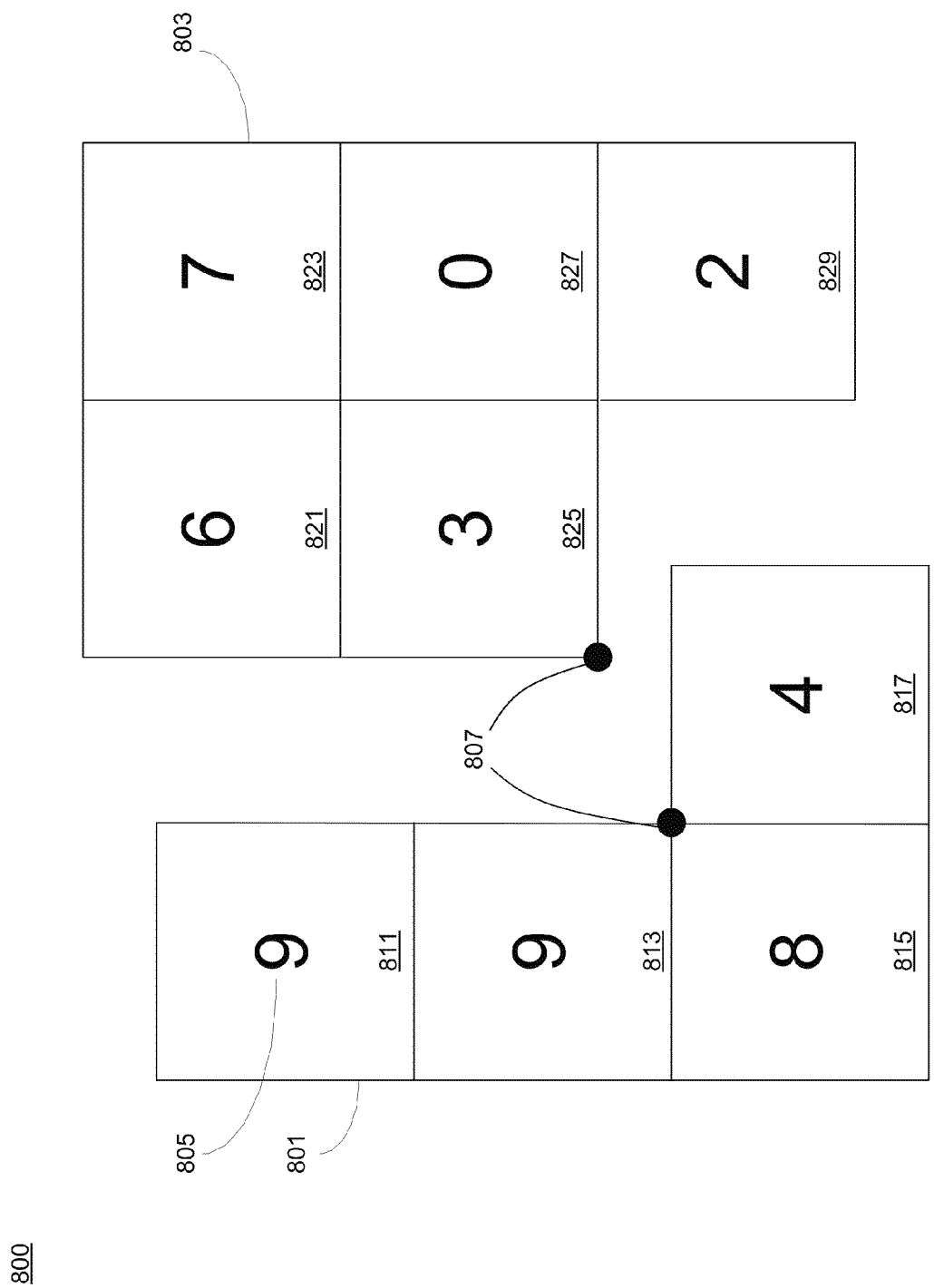
FIG. 8 illustrates a representation of an object fractured into two fragments and associated surface characteristic data for each fragment.

To illustrate this problem, FIG. 8 shows a representation of the surface of an object 800 to be fractured. The object 800 to be fractured may include a first fragment 801 and a second fragment 803. The surface representation of first fragment 801 may include a polygonal representation comprising polygons 811, 813, 815, and 817. Additionally, the surface representation may include surface characteristic data 805 associated with each polygon 811, 813, 815, and 817 of the polygonal representation, such as texture coordinates, part information, metadata, color, and the like. It should be appreciated that surface characteristics data 805 of each polygon are shown as single values for illustrative purposes only. Surface characteristic data 805 may include more complex values representing more complex attributes, such as texture coordinates, part information, metadata, color, and the like. Similarly, the surface representation of second fragment 803 may include a polygonal representation comprising polygons 821, 823, 825, 827, and 829. Additionally, the surface representation may include surface characteristic data 805 associated with each polygon 821, 823, 825, 827, and 829 of the polygonal representation, such as texture coordinates, part information, metadata, color, and the like. In one example, first fragment 801 and second fragment 803 may be used to reconstruct object 800 and may represent portions of object 800 that are adjacent to each other in the reconstructed object.

Additionally, FIG. 8 shows vertex 807 on both first fragment 801 and second fragment 803. The value at a particular vertex may be determined by averaging the values associated with all adjacent polygons. For example, to evaluate vertex 807 on first fragment 801, the values 9, 8, and 4, corresponding to polygons 813, 815, and 817, respectively, produce an average value of 7. Evaluating the same vertex 807 on second fragment 803 produces an average value of 3, since the only polygon adjacent to vertex 807 on second fragment 803 is polygon 825. Thus, when first fragment 801 and second fragment 803 are placed together to form object 800, a visible discontinuity may be produced due to the different values calculated for vertex 807 (7 on first fragment 801 and 3 on second fragment 803).

To reduce the discontinuity, ghost cells may be used, for example, as described by exemplary process 700. Exemplary process 700 will be described with reference to an example illustrated by FIGS. 8-10.

At block 710, ghost cells 921, 925, 927, and 929 may be generated for rendering first fragment 801. Ghost cells 921, 925, 927, and 929 may represent at least a portion of second fragment 803. In one example, the portion of second fragment 803 represented by ghost cells 921, 925, 927, and 929 may include the surface characteristic data associated with polygons 821, 825, 827, and 829 of second fragment 803 that are adjacent to first fragment 801 in fractured object 800.

In another example, ghost cells 1011, 1013, 1015, and 1017 may also be generated for rendering second fragment 803. Ghost cells 1011, 1013, 1015, and 1017 may represent at least a portion of first fragment 801. In one example, the portion of first fragment 801 represented by ghost cells 1011, 1013, 1015, and 1017 may include the surface characteristic data associated with polygons 811, 813, 815, and 817 of first fragment 801 that are adjacent to first fragment 801 in fractured object 800.

Figure 9:
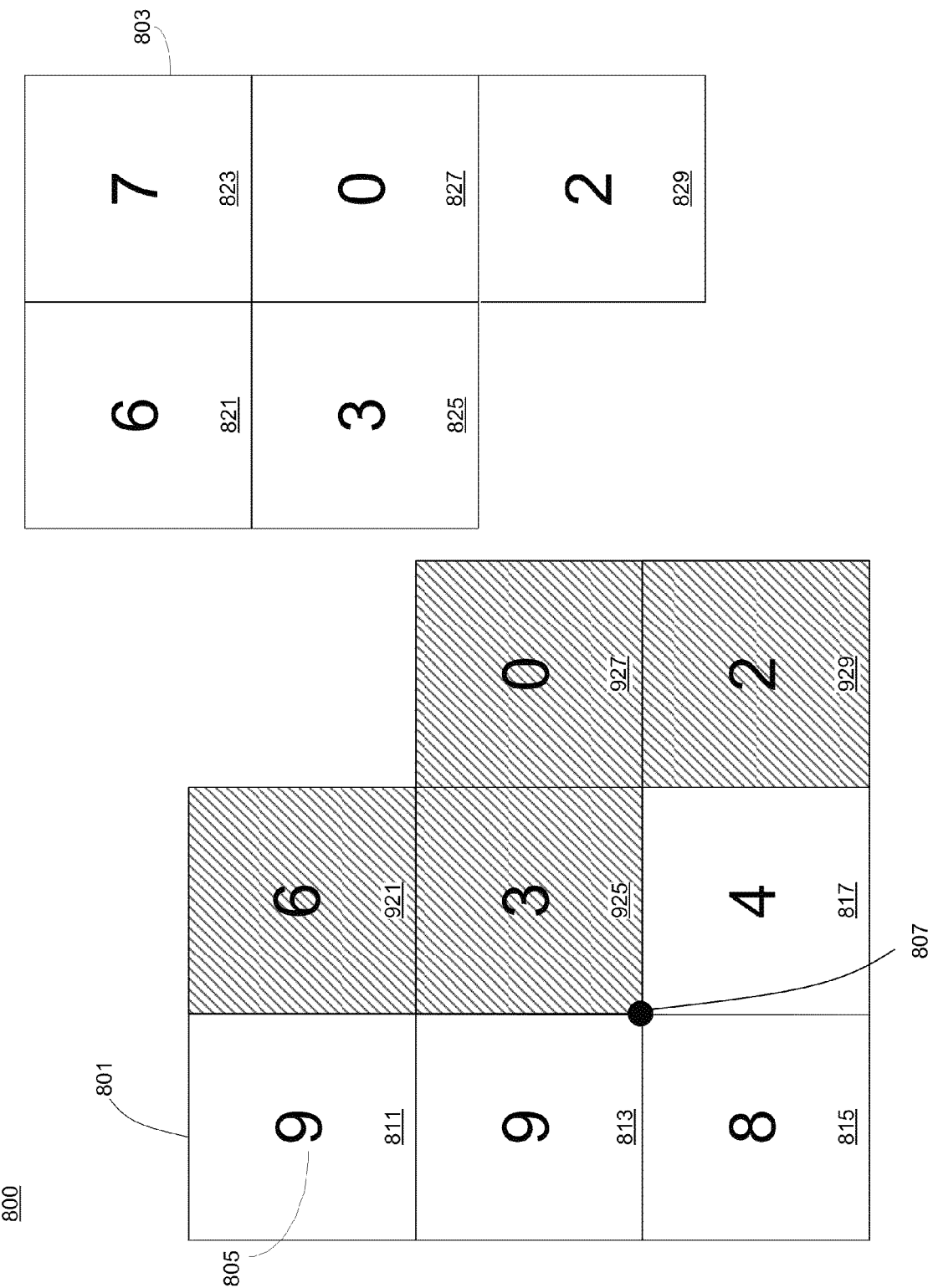
FIG. 9 illustrates the first fragment of FIG. 8 combined with ghost cells representing a portion of the second fragment of FIG. 8.

At block 720, the surface representation of first fragment 801 may be associated with ghost cells 921, 925, 927, and 929 generated at block 730. The association of the surface representation of first fragment 801 and ghost cells 921, 925, 927, and 929 (represented by dashed cells) is illustrated by FIG. 9.

Figure 10:
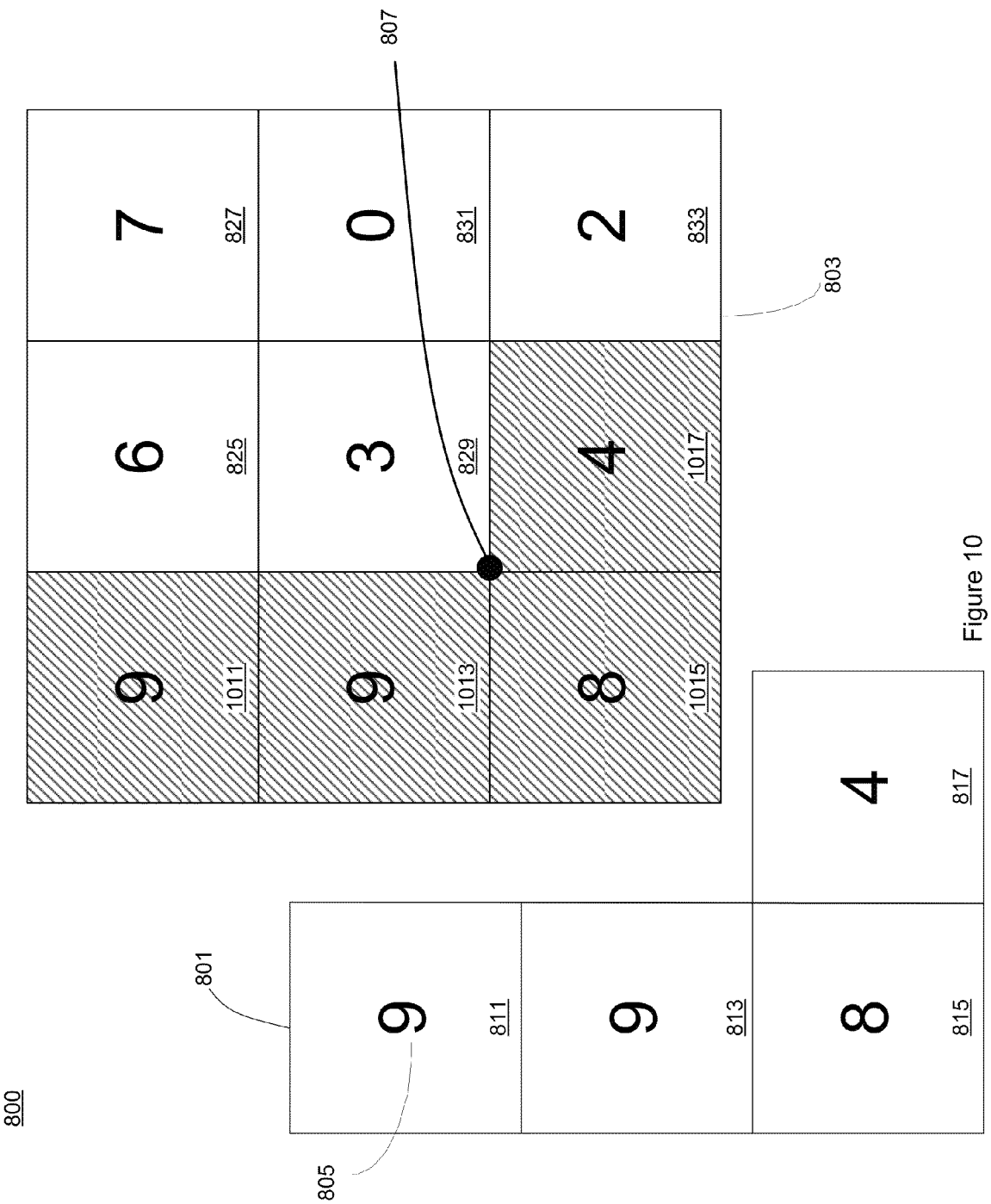
FIG. 10 illustrates the second fragment of FIG. 8 combined with ghost cells representing a portion of the first fragment of FIG. 8.

In one example, block 720 may also include associating the surface representation of second fragment 803 with ghost cells 1011, 1013, 1015, and 1017 generated at block 730. The association of the surface representation of second fragment 803 and ghost cells 1011, 1013, 1015, and 1017 (represented by dashed cells) is illustrated by FIG. 10.

At block 730, characteristics of first fragment 801 may be evaluated using the surface representation of first fragment 801 and the ghost cells generated at block 730. In one example, the characteristics being evaluated may include surface information, such as texture coordinates, color, and the like. The use of ghost cells may eliminate, or at least reduce, the visible discontinuity described above with respect to FIG. 8. For example, referring to FIG. 9, evaluating vertex 807 on first fragment 801 using ghost cell 925 produces an average value of 6 ((9+3+8+4)/4=6). Similarly, referring to FIG. 10, evaluating vertex 807 on second fragment 803 using ghost cells 1013, 1015, and 1017, produces an average value of 6 ((9+3+8+4)/4=6). Thus, the values produced for vertex 807 on first fragment 801 and second fragment 803 when using ghost cells are identical. As a result, when first fragment 801 and second fragment 803 are placed side-by-side to reconstruct object 800, the visible discontinuity described above is eliminated, or at least reduced. A similar process as described above may be applied to each vertex of the fragment.

As described above, ghost cells may be used to evaluate characteristics of a fragment of a fractured object. However, the ghost cells may not be displayed when displaying the fragment. Thus, at block 140 of FIG. 1, the ghost cells added at block 720 of FIG. 7 are not displayed with the representation of the one or more fragments. Additionally, while the examples described above show an object fractured into two fragments, one of ordinary skill in the art will appreciate that the concepts described above can similarly be applied to an object fractured into more than two fragments.

Figure 11A:
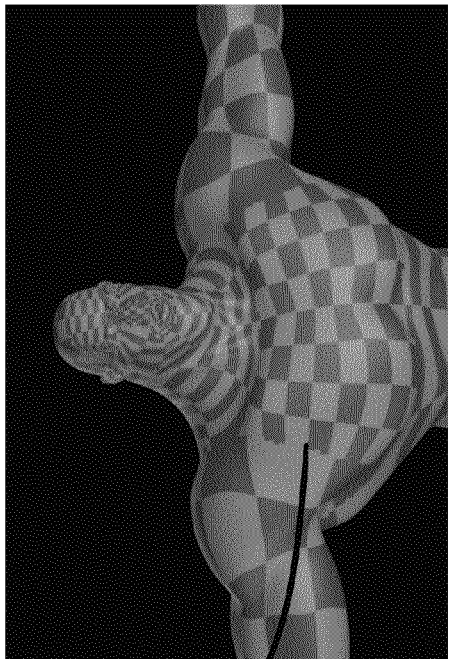
FIGS. 11A-C illustrate exemplary images rendered with and without the use of ghost cells.
Figure 11B:
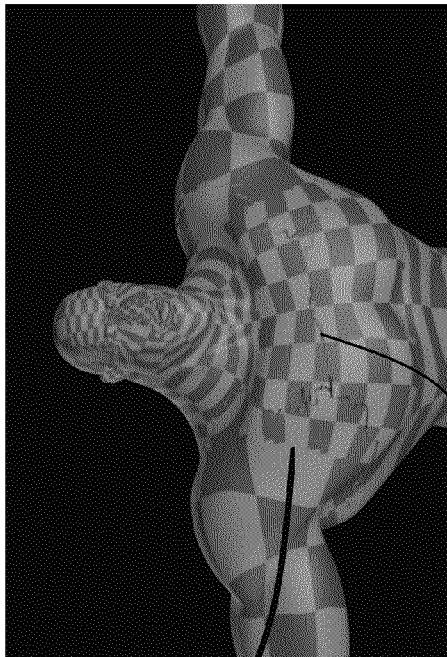
Figure 11C:
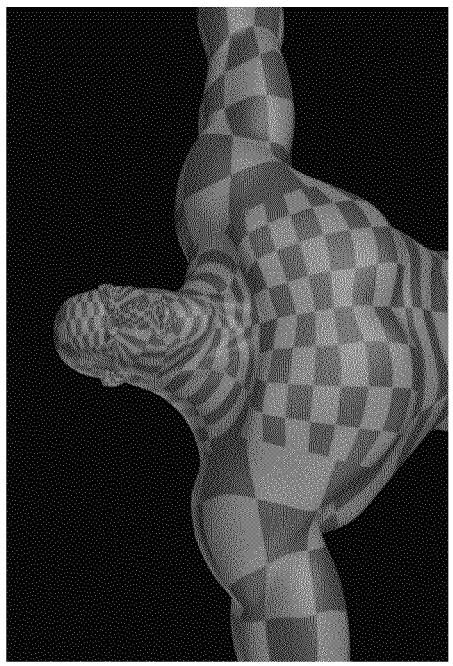

FIG. 11 illustrates the effect of ghost cells by showing an object rendered without ghost cells and without a smoothing algorithm, with ghost cells and without a smoothing algorithm, and with both ghost cells and a smoothing algorithm. The image in FIG. 11A was generated without the use of ghost cells or a smoothing algorithm, as described herein. In this image, fracture lines 1101 can be seen, for example, across the chest and around the shoulders. Additionally, jagged edges 1103 may be seen, for example, between the chest and arms. The image in FIG. 11B was generated using ghost cells but without a smoothing algorithm, as described herein. In this image, the fracture lines 1101 present in FIG. 11A are not visible, but the jagged edges 1103 between the chest and arms are still present. The image in FIG. 11C was generated using ghost cells and a smoothing algorithm, as described herein. In this image, the fracture lines 1101 and jagged edges 1103 that are visible in FIG. 11A are not present.

Figure 12:
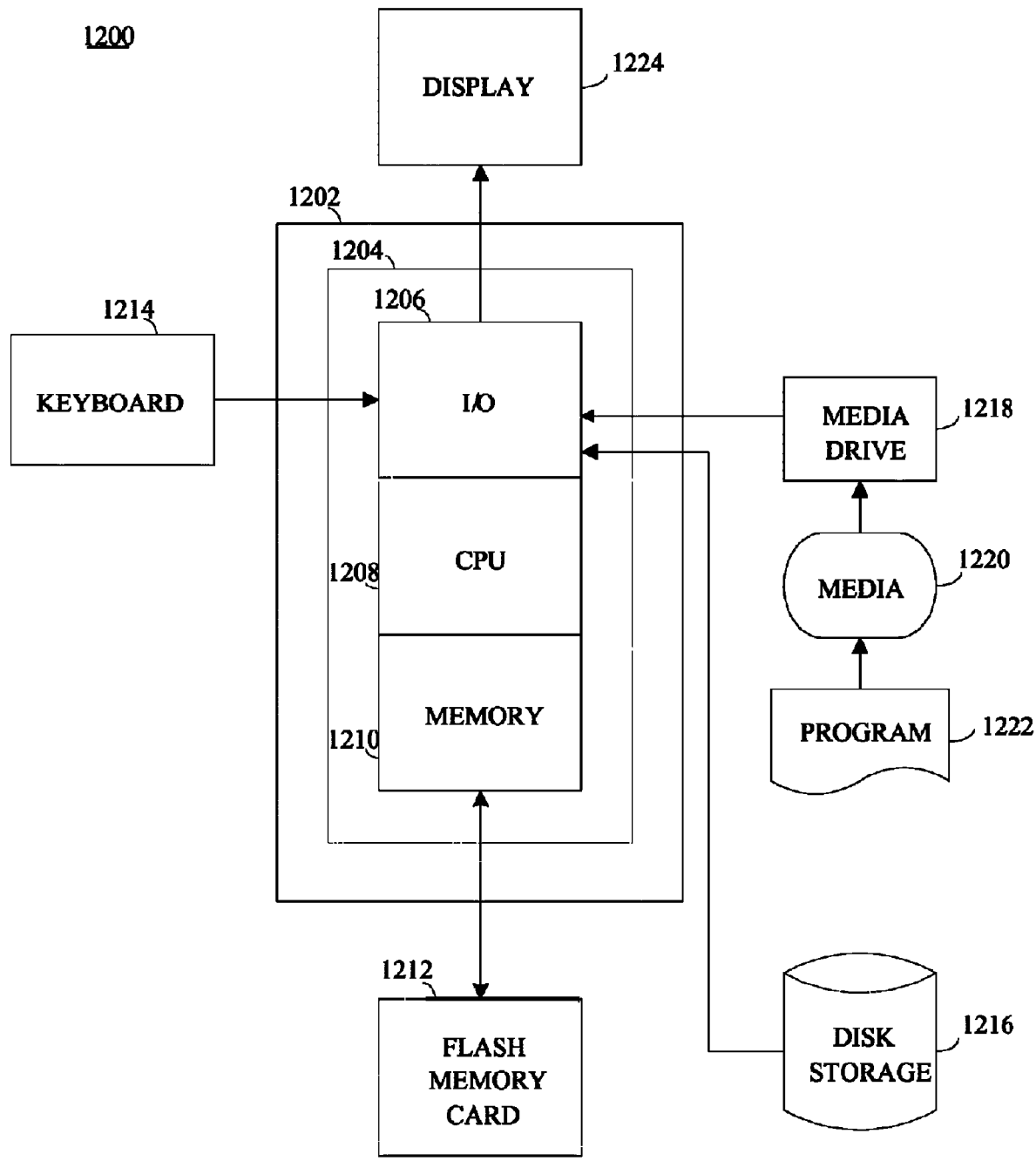
FIG. 12 illustrates an exemplary computing system.

FIG. 12 depicts an exemplary computing system 1200 configured to perform any one of the above-described processes. In this context, computing system 1200 may include, for example, a processor, memory, storage, and input/output devices (e.g., monitor, keyboard, disk drive, Internet connection, etc.). However, computing system 1200 may include circuitry or other specialized hardware for carrying out some or all aspects of the processes. In some operational settings, computing system 1200 may be configured as a system that includes one or more units, each of which is configured to carry out some aspects of the processes either in software, hardware, or some combination thereof.

FIG. 12 depicts an exemplary computing system 1200 with a number of components that may be used to perform the above-described processes. The main system 1202 includes a motherboard 1204 having an input/output ("I/O") section 1206, one or more central processing units ("CPU") 1208, and a memory section 1210, which may have a flash memory card 1212 related to it. The I/O section 1206 is connected to a display 1224, a keyboard 1214, a disk storage unit 1216, and a media drive unit 1218. The media drive unit 1218 can read/write a computer-readable medium 1220, which can contain programs 1222 or data.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general purpose programming language (e.g., Pascal, C, C++) or some specialized application-specific language.

Although only certain exemplary embodiments have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A computer-enabled method for rendering a reconstructed object comprising a plurality of fragments, wherein the reconstructed object is for animating an object to be fractured into the plurality of fragments, the method comprising:
converting a surface representation of the object into a volumetric representation of the object;
generating vector data associated with the surface representation of the object, wherein the vector data comprises normal vector data and position data associated with the surface representation of the object;
defining the plurality of fragments into which the object is to be fractured by dividing the volumetric representation of the object into a volumetric representation for each of the plurality of fragments;
generating a surface representation for each of the plurality of fragments based at least in part on the volumetric representation for each of the plurality of fragments and the vector data; and
causing a display of the surface representation for each of the plurality of fragments arranged to form the reconstructed object.

2. The computer-enabled method of claim 1, wherein generating the surface representation for each of the plurality of fragments comprises generating a first surface representation of a first fragment of the plurality of fragments, and wherein data associated with a second fragment of the plurality of fragments is used to generate the first surface representation of the first fragment of the plurality of fragments.

3. The computer-enabled method of claim 2, wherein the data associated with the second fragment of the plurality of fragments is not displayed with the surface representation for each of the plurality of fragments arranged to form the reconstructed object.

4. The computer-enabled method of claim 2, wherein the data associated with the second fragment of the plurality of fragments comprises one or more members selected from the group consisting of texture coordinates, part information, and color.

5. The computer-enabled method of claim 2, wherein the data associated with the second fragment of the plurality of fragments comprises color.

6. The computer-enabled method of claim 1, wherein generating the surface representation for each of the plurality of fragments comprises using at least one ghost cell, and wherein the at least one ghost cell is not displayed with the surface representation for each of the plurality of fragments arranged to form the reconstructed object.

7. The computer-enabled method of claim 1, wherein generating the plurality of surface representations for each of the plurality of fragments comprises using a dual contouring method.

8. The computer-enabled method of claim 1, wherein converting the surface representation of the object into the volumetric representation of the object comprises using a ray-stabbing method.

9. A non-transitory computer-readable storage medium encoded with computer-executable instructions for rendering a reconstructed object comprising a plurality of fragments, wherein the reconstructed object is for animating an object to be fractured into the plurality of fragments, the instructions comprising:
converting a surface representation of the object into a volumetric representation of the object;
generating vector data associated with the surface representation of the object, wherein the vector data comprises normal vector data and position data associated with the surface representation of the object;

defining the plurality of fragments into which the object is to be fractured by dividing the volumetric representation of the object into a volumetric representation for each of the plurality of fragments;

generating a surface representation for each of the plurality of fragments based at least in part on the volumetric representation for each of the plurality of fragments and the vector data; and causing a display of the surface representation for each of the plurality of fragments arranged to form the reconstructed object.

10. The non-transitory computer-readable storage medium of claim 9, wherein generating the surface representation for each of the plurality of fragments comprises generating a first surface representation of a first fragment of the plurality of fragments, and wherein data associated with a second fragment of the plurality of fragments is used to generate the first surface representation of the first fragment of the plurality of fragments.

11. The non-transitory computer-readable storage medium of claim 10, wherein the data associated with the second fragment of the plurality of fragments is not displayed with the surface representation for each of the plurality of fragments arranged to form the reconstructed object.

12. The non-transitory computer-readable storage medium of claim 10, wherein the data associated with the second fragment of the plurality of fragments comprises one or more members selected from the group consisting of texture coordinates, part information, and color.

13. The non-transitory computer-readable storage medium of claim 10, wherein the data associated with the second fragment of the plurality of fragments comprises color.

14. The non-transitory computer-readable storage medium of claim 9, wherein generating the surface representation for each of the plurality of fragments comprises using at least one ghost cell, and wherein the at least one ghost cell is not displayed with the surface representation for each of the plurality of fragments arranged to form the reconstructed object.

15. The non-transitory computer-readable storage medium of claim 9, wherein generating the plurality of surface representations for each of the plurality of fragments comprises using a dual contouring method.

16. The non-transitory computer-readable storage medium of claim 9, wherein converting the surface representation of the object into the volumetric representation of the object comprises using a ray-stabbing method.

* * * * *